United States Patent Office 2,901,494
Patented Aug. 25, 1959

2,901,494

9,16-DIHALO STEROIDS OF THE ANDROSTANE SERIES

Josef Fried, Princeton, and Gordon H. Thomas, New Brunswick, N.J., assignors to Olin Mathieson Chemical Corporation, New York, N.Y., a corporation of Virginia No Drawing. Application November 25, 1957
Serial No. 698,321

13 Claims. (Cl. 260—397.3)

This application is a continuation-in-part of our parent application, Serial No. 638,674, filed February 7, 1957, now U.S. Patent No. 2,857,403, granted October 21, 1958.

This invention relates to, and has for its object the provision of, a method of preparing 9,16-dihalo steroids of the androstane (including the androstene) series and to the physiologically active steroids produced thereby.

The compounds of this invention are prepared by sulfonating a 9α-halo-11β-hydroxy (or 11-keto)-16α-hydroxyandrostenedione (which can be prepared as disclosed in the U.S. application of Thomas et al., Serial No. 693,039, filed October 29, 1957, now Patent No. 2,853,502, granted September 23, 1958), reacting the 16α-sulfonyloxy derivative formed with an alkali metal halide or alkaline earth metal halide to yield the corresponding 16-halo derivative, and, if desired, either reducing the 17-keto group to a 17-hydroxy grouping or treating with a Grignard reagent to yield the corresponding 17α-substituted-17β-hydroxy derivative. Furthermore the 17-hydroxy derivatives can be acylated to yield a 17-acyloxy derivative as the final product.

The compounds of this invention may be represented by the general formula:

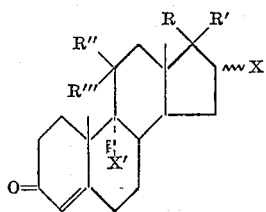

wherein individually R is hydroxy or acyloxy, R' is hydrogen or together R and R' is keto, R" is hydrogen, R''' is β-hydroxy, or together R" and R''' is keto, X is halo (which may be in either the alpha or beta position) and X' is halo (preferably fluoro).

To prepare the compounds of this invention a 9α-halo-11β-hydroxy (or 11-keto)-16α-hydroxyandrostene is treated with an organic sulfonating agent such as a lower alkane sulfonyl halide (e.g., mesyl chloride) or a monocyclic aromatic sulfonyl halide (e.g., tosyl chloride). This reaction is preferably conducted in the cold in the presence of organic base, such as pyridine. The reaction results in the formation of the new sulfonic acid esters of 9α-halo-11β-hydroxy (or 11-keto)-16α-hydroxyandrostenes of this invention.

Among the suitable starting materials for this reaction may be mentioned the 9α-halo-11β,16α-dihydroxy- androstenediones (e.g. 9α-fluoro-Δ⁴-androstene-11β, 16α-diol -3,17-dione and 9α-chloro-Δ⁴-androstene-11β,16α-diol-3,17-dione) and the 9α-halo-16α-hydroxyandrostenetriones (e.g. 9α-fluoro-Δ⁴-androstene-16α-ol-3,11,17-trione and 9α-chloro-Δ⁴-androstene 16α-ol-3,-11,17-trione).

The sulfonic acid esters formed are then reacted with an alkali metal halide (e.g., potassium fluoride, potassium hydrofluoride, lithium bromide and sodium iodide) or an alkaline earth metal halide (e.g., calcium chloride) to yield a 16-haloandrostene derivative, wherein the halide corresponds to the halogen ion of the inorganic reactant. The reaction is preferably conducted under substantially anhydrous conditions at an elevated temperature.

To form the 16-halo-17-hydroxy steroids of this invention, the 17-keto group is reduced. The reduction may be accomplished by treating with a borohydride (e.g. sodium borohydride). If an 11-keto steroid is employed as a reactant in this reduction, the 11-keto group is also reduced to the 11β-hydroxy derivative. To form, therefor, an 11-keto-17β-hydroxy derivative, the 11β-17β-dihydroxy steroid is esterified, in the usual manner, as by treatment with an acyl halide or acid anhydride of any desired acid to protect the 17β-hydroxyl group and the 11β-hydroxy group is then oxidized, as by treatment with chromium trioxide in aqueous sulfuric acid in a solvent such as acetone, to the desired 11-keto analogue. The 17β-acyloxy group can then be hydrolyzed to the free 17β-hydroxy compound in the usual manner, as by treatment with an alkali metal hydroxide, such as potassium hydroxide, in an organic solvent such as methanol. Among the suitable agents which can be used are the acyl chlorides and acid anhydrides of hydrocarbon carboxylic acids having less than ten carbon atoms, as exemplified by the lower alkanoic acids (e.g. acetic and propionic acid), the monocyclic aromatic carboxylic acids (e.g. benzoic and toluic acid), the monocyclic aralkanoic acids (e.g. phenacetic and β-phenylpropionic acid), the lower alkenoic acids, the cycloalkane carboxylic acids, and the cycloalkene carboxylic acids. The acylation step is preferably conducted in the presence of an organic base, such as pyridine.

This series of steps can be represented by the following schematic analysis, using 9α-fluoro-11β,16α-dihydroxy-androstenedione as the starting material:

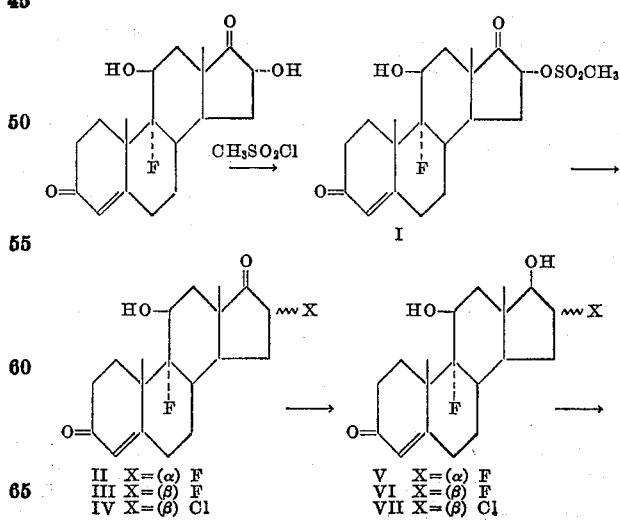

II X=(α) F
III X=(β) F
IV X=(β) Cl

V X=(α) F
VI X=(β) F
VII X=(β) Cl

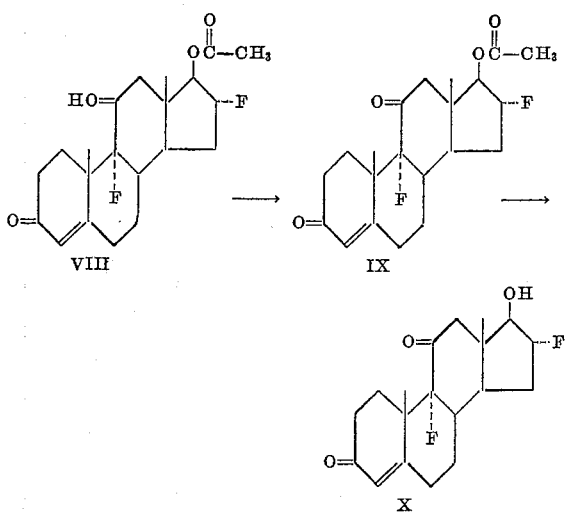

The compounds of this invention are physiologically active substances which possess androgenic activity. Thus, the compounds of this invention can be used in lieu of known androgenic steroids, such as testosterone and methyltestosterone, in the treatment of menopausal disorders, being formulated for such administration in the same type of preparations as testosterone, for example, with concentration and/or dosage based on the activity of the particular compound.

The following examples illustrate the invention (all temperatures being in centigrade):

EXAMPLE 1

*9α-fluoro-Δ⁴-androstene - 16α,11β - diol - 3,17 - dione 16α-mesylate (I)*

A solution of 3 g. of 9α-fluoro-11β,16α-dihydroxyandrostene-dione and 3 ml. methanesulfonyl chloride in 30 ml. of pyridine is allowed to stand at 0° for 18 hours. The mixture is then diluted with water, the precipitated solid [about 3.18 g., M.P. about 215–224° (dec.)] collected and washed well with water. Crystallization from chloroform-methanol gives the pure 16α-mesylate, M.P. about 232–234° (dec.); $[\alpha]_D$ +134.6° (c., 0.98 in $CHCl_3$);

$\lambda_{max.}^{alc.}$ 237 m$\mu$ ($\epsilon$=18,100); $\lambda_{max.}^{Nujol}$ 3.02, 5.67, 6.06, 7.33$\mu$

*Analysis.*—Calcd. for $C_{20}H_{27}O_6FS$ (408.43): C, 57.95; H, 6.57; F, 4.58; S, 7.74. Found: C, 57.35; H, 6.64; F, 4.63; S, 7.79.

Similarly, by substituting 9α-chloro-11β-16α-dihydroxyandrostenedione, 9α - fluoro-16α-hydroxyandrostenetrione (i.e., 9α-fluoro-Δ⁴-androstene-16α-ol-3,11,17-trione), and 9α-chloro-16α-hydroxyandrostenetrione for the 9α-fluoro-11β,16α-dihydroxyandrostenedione in the procedure of Example 1, the corresponding 16α-mesylates are formed, respectively.

EXAMPLE 2

*9α,16α-difluoro-Δ⁴-androstene-11β-ol-3,17-dione (II) and 9α,16β-difluoro-Δ⁴-androstene-11β-ol-3,17-dione (III)*

A stirred solution of 3 g. of 9α-fluoro-Δ⁴-androstene-11β,16α-diol-3,17-dione 16α-mesylate, and 2.3 g. of anhydrous potassium fluoride in 60 ml. of diethylene glycol is heated at 110° for 18 hours. The mixture is then diluted with water and extracted with chloroform, the chloroform extract then being washed with water, dried over sodium sulfate and evaporated to dryness in vacuo. The resultant gum is dissolved in 10 ml. of benzene and absorbed on 30g. of acid-washed alumina. Elution with chloroform-benzene (1:4), followed by crystallization from acetone-hexane, gives 9α,16β-difluoroandrostene-11β-ol-3,17-dione. Elution with chloroform-benzene (1:1), followed by crystallization from acetone-hexane gives 9α,16α-difluoroandrostene-11β-ol-3,17-dione.

EXAMPLE 3

*9α-fluoro - 16β - chloro - Δ⁴ - androstene - 11β - ol-3,17-dione (IV)*

A solution of 200 mg. of 9α-fluoro-Δ⁴-androstene-11β, 16α-diol-3,17-dione 16α-mesylate and 400 mg. of calcium chloride in 10 ml. of absolute alcohol is heated under reflux for 3 days. Water is added and the steroids extracted with chloroform, the chloroform solution then being washed with water, dried over sodium sulfate and the solvent removed in vacuo. The residue is dissolved in 2 ml. of benzene and absorbed on 5 g. of acid-washed alumina. Elution with chloroform in benzene (1:9, 250 ml.; 1:4, 350 ml.) followed by crystallization from acetone-hexane yields about 37 mg. of the 16β-chloro compound M.P. about 263–266° (dec.); $[\alpha]_D$ +170° (c., 0.94 in CHCl);

$\lambda_{max.}^{alc.}$ 237 m$\mu$ ($\epsilon$=17,200); $\lambda_{max.}^{Nujol}$ 2.86, 5.72, 6.00, 6.17$\mu$

*Analysis.*—Calcd. for $C_{19}H_{24}O_3ClF$ (354.84): Cl, 9.99; F, 5.35. Found: Cl. 9.74; F, 5.09.

Similarly, by substituting (a) 9α-chloro-16α-hydroxyandrostenetrione 16-mesylate, (b) 9α-fluoro-16α-hydroxy-androstenetrione 16α-mesylate, and (c) 9α-chloro-11β, 16α-dihydroxyandrostenedione 16α-mesylate for the 9α-fluoro - 11β - 16α - dihydroxyandrostenedione 16α-mesylate in the procedures of Examples 2 and 3, there are obtained, respectively: (a) 9α-chloro-16α-fluoroandrostenetrione, 9α-chloro-16β-fluoroandrostenetrione, and 9α,16β-dichloroandrostenetrione; (b) 9α,16α-difluoroandrostenetrione, 9α,16β-difluoroandrostenetrione, 9α-fluoro-16β-chloroandrostenetrione; and (c) 9α-chloro-16α-fluoro-11β-hydroxyandrostenedione, 9α-chloro-16β-fluoro-11β-hydroxyandrostenedione, and 9α,16β-dichloro-11β-hydroxyandrostenedione.

EXAMPLE 4

*9α-16β-difluoro-11β-hydroxytestosterone (VI)*

A solution of 50 mg. of 9α-16β-difluoro-Δ⁴-androstene-11β-ol-3,17-dione in 10 ml. of methanol is stirred with 9 mg. of sodium borohydride for one hour at 0°. After acidification to pH 6 with 10% acetic acid, the reaction is diluted with water and the steroids extracted with chloroform. The chloroform extract is washed well with water, dried over sodium sulfate and evaporated to dryness in vacuo. Crystallization of the residual solid gives pure 9α,16β-difluoro-11β-hydroxytestosterone.

EXAMPLE 5

*9α,16α-difluoro-11β-hydroxytestosterone (V)*

Following the procedure of Example 4, but substituting 50 mg. of 9α,16α-difluoro-Δ⁴-androstene-11β-ol-3,17-dione for the 16β-fluoro derivative, there is obtained pure 9α, 16β-difluoro-11β-hydroxytestosterone.

EXAMPLE 6

*9α-fluoro-16β-chloro-11β-hydroxytestosterone (VII)*

To a solution of 100 mg. of 16β-chloro-9α-fluoro-Δ⁴-androstene-11β-ol-3,17-dione in 20 ml. of methanol is added at 0° with stirring 18 mg. of sodium borohydride. The mixture is allowed to remain at 0° for 1 hour and is then neutralized by the addition of 10% acetic acid. Water is added and the steroids are extracted with chloroform, the chloroform extract then being washed with water, dried over sodium sulfate and evaporated to dryness in vacuo. The residual solid after two recrystallizations from acetone-hexane gives pure 16β-chloro-9α-fluoro-11β-hydroxytestosterone.

Similarly, 9α-chloro-16α-fluoro-11β-hydroxyandrostenedione, 9α-chloro-16β-fluoro-11β-hydroxyandrostenedione, and 9α,16β-dichloro-11β-hydroxyandrostenedione are reduced to 9α-chloro-16α-fluoro-11β-hydroxytestosterone, 9α-chloro-16β-fluoro-11β-hydroxytestosterone and 9α,16β-dichloro-11β-hydroxytestosterone, respectively.

EXAMPLE 7

9α,16α-difluoro-11β-hydroxytestosterone 17β-acetate (VIII)

A solution of 500 mg. of 9α,16α-difluoro-11β-hydroxytestosterone in 10 ml. of anhydrous pyridine and 3 ml. of acetic anhydride is allowed to stand at room temperature for 15 hours. The mixture is diluted with water and the precipitated material collected, washed with water and dried in vacuo. Crystallization from acetone-hexane gives an analytical sample of 9α,16α-difluoro-11β-hydroxytestosterone 17β-acetate.

Similarly, 9α,16β-difluoro-11β-hydroxytestosterone, 9α-fluoro-16β-chloro-11β-hydroxytestosterone, 9α-chloro-16α-fluoro-11β-hydroxytestosterone, 9α-chloro-16β-fluoro-11β-hydroxytestosterone and 9α,16β-dichloro-11β-hydroxytestosterone can be 17β-acetylated. Furthermore, if another acylating agent such as propionic anhydride and benzoyl chloride is substituted for the acetic anhydride in the procedure of Example 7, the corresponding 17β-propionate and 17β-benzoate derivatives are formed, respectively.

EXAMPLE 8

9α,16α-difluoro-11-ketotestosterone 17β-acetate (IX)

To a solution of 250 mg. of 9α,16α-difluoro-11β-hydroxytestosterone 17β-acetate in 20 ml. of acetone is added with stirring chromium trioxide in 0.67 N sulfuric acid (200 mg./ml.) until a permanent brown coloration is obtained. The mixture is then stirred for one hour. Dilution with water gives 9α,16α-difluoro-11-ketotestosterone 17β-acetate which is crystallized from acetone-hexane to give a pure sample.

Similarly all other 17β-esters of 9α,16-dihalo-11β-hydroxytestosterones can be oxidized to the corresponding 11-keto derivatives.

EXAMPLE 9

9α,16α-difluoro-11-ketotestosterone (X)

To a solution of 200 mg. of 9α,16α-difluoro-11-ketotestosterone 17β-acetate in 10 ml. of methanol is added, under nitrogen, 4 ml. of 2.5% potassium hydroxide solution, the mixture then being left at room temperature for six hours. The solution is then diluted with water and the steroids extracted with chloroform. The chloroform extract is washed with water, dried over sodium sulfate and evaporated to dryness in vacuo. Crystallization of the residue from acetone-hexane gives 9α,16α-difluoro-11-ketotestosterone.

Similarly all other 17β-esters of 9α,16-dihalo-11-ketotestosterones can be hydrolyzed to the free 17-hydroxyl derivatives.

The invention may be otherwise variously embodied within the scope of the appended claims.

What is claimed is:

1. A steroid of the general formula

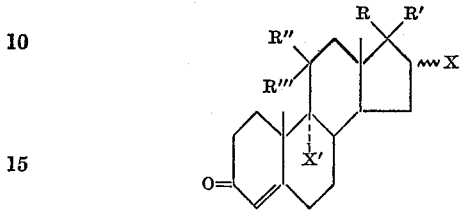

wherein individually R is selected from the group consisting of hydroxy and the acyloxy radical of a hydrocarbon carboxylic acid having less than ten carbon atoms and R' is hydrogen and together R and R' is keto, individually R'' is hydrogen, R''' is β-hydroxy, and together R'' and R''' is keto, and X and X' are halo.

2. 9α,16-dihalo-Δ⁴-androstene-11β-ol-3,17-dione.
3. 9α,16-dihalo-Δ⁴-androstene-3,11,17-trione.
4. 9α,16-dihalo-11β-hydroxytestosterone.
5. 9α,16-dihalo-11-ketotestosterone.
6. 9α,16α-dihalo-11β-hydroxytestosterone 17β-acetate.
7. A process for preparing a steroid of claim 1, which comprises treating a 16α-sulfonic acid ester of a steroid selected from the group consisting of 9α-halo-Δ⁴-androstene-11β,16α-diol-3,17-dione and 9α-halo-Δ⁴-androstene-16α-ol-3,11,17-trione with a compound selected from the group consisting of an alkali metal halide and an alkaline earth metal halide.
8. A process for preparing a 9α,16-dihalo-11β-hydroxytestosterone which comprises treating the corresponding 17-ketone derivative with a reducing agent.
9. 9α,16α-difluoro-Δ⁴-androstene-11β-ol-3,17-dione.
10. 9α,16β-difluoro-Δ⁴-androstene-11β-ol-3,17-dione.
11. 9α,16α-difluoro-11β-hydroxytestosterone.
12. 9α,16α-difluoro-11β-hydroxytestosterone 17β-acetate.
13. 9α,16α-difluoro-11-ketotestosterone.

References Cited in the file of this patent
UNITED STATES PATENTS 2,759,929    Farrar et al. _____ Aug. 21, 1956